UNITED STATES PATENT OFFICE.

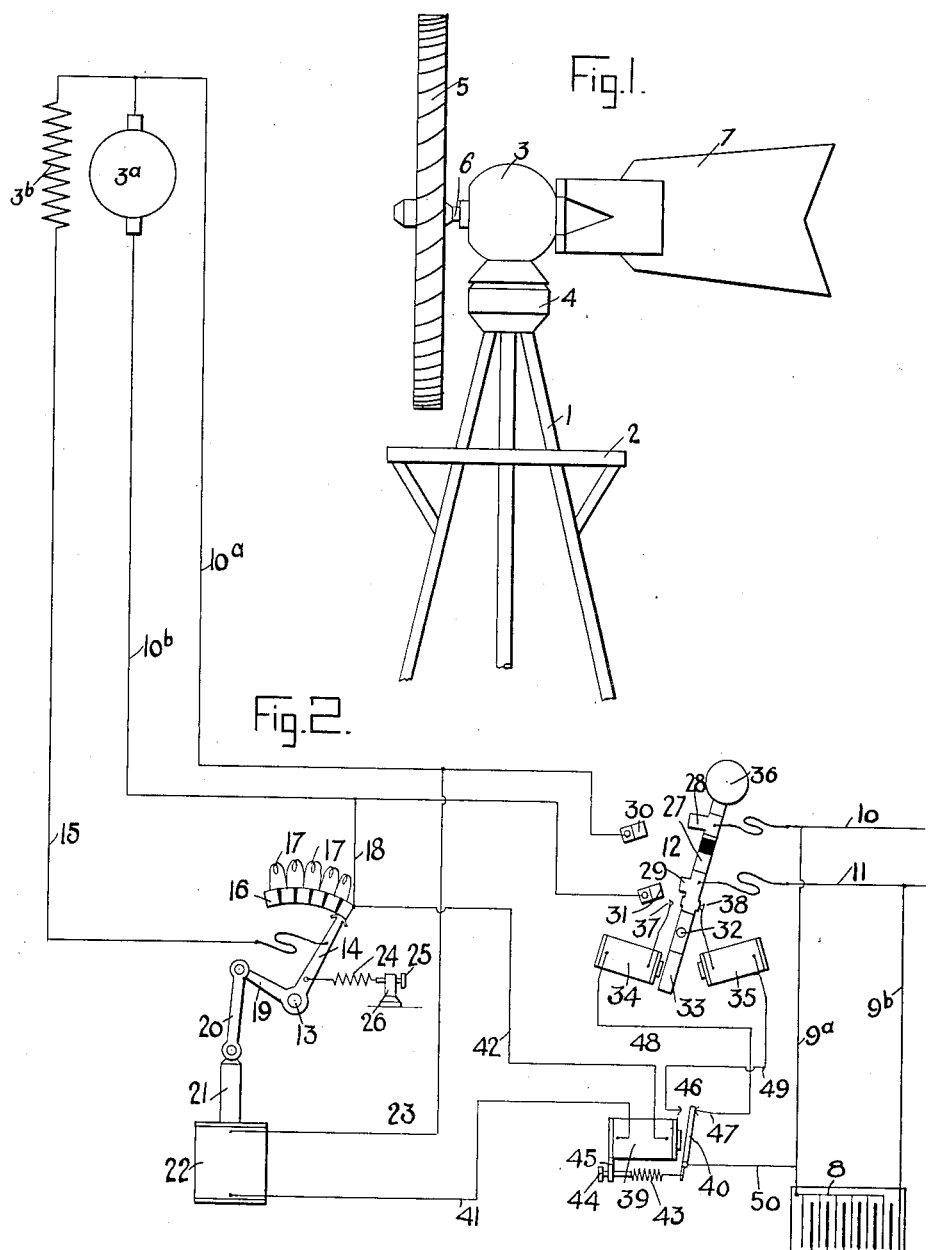

ALBERT H. HEYROTH, OF GREAT FALLS, MONTANA.

SYSTEM OF ELECTRICAL SUPPLY.

1,114,760. Specification of Letters Patent. Patented Oct. 27, 1914.

Application filed January 3, 1913. Serial No. 740,004.

*To all whom it may concern:*

Be it known that I, ALBERT H. HEYROTH, a citizen of the United States, and a resident of Great Falls, in the county of Cascade and State of Montana, have invented a new and Improved System of Electrical Supply, of which the following is a full, clear, and exact description.

This invention relates generally to systems of electrical supply, and more particularly to means for placing a generator into or out of coöperative relation with the storage battery, the condition determining the operation of the said means being the E. M. F. of the generator.

The principal object of the invention is to provide a combination of elements co-acting with the storage battery and supply mains, whereby the generator operating in parallel with the battery may be cut out of such operation in the event that the voltage of the generator falls below a certain amount.

The invention herein described and claimed is adapted for use with the windmill power plant described and claimed in my co-pending application, Serial No. 737,202, filed Dec. 17, 1912.

In sources of electrical supply made up of storage batteries and generators which operate in multiple, it is necessary that the voltage of the generator does not drop below a certain amount while the battery and generator are both connected to the line of distribution, and in the present instance a switch and a coöperating relay actuated by the voltage of the generator serve to disconnect the generator in the event that the voltage of the machine drops below a certain amount.

Reference is to be had to the accompanying drawings forming a part of this specification, in which like characters of reference indicate corresponding parts in both views, and in which—

Figure 1 is a side view of a windmill power plant showing the location of the generator; while Fig. 2 is a diagrammatic showing of the various elements which make up the system of supply.

This system is especially adapted for use with windmill power plants, and to this end a windmill structure is shown, which comprises standards 1 carrying a platform 2 adjacent the top, the generator 3 being movably mounted on the turntable 4 carried by the standards, the wind wheel 5 being connected to the shaft 6 of the generator; in order to determine the relation between the wind wheel and the air currents the usual vane 7 is made use of, being preferably connected to the generator and wheel structure.

In Fig. 2 the generator comprises an armature $3^a$ and a field winding $3^b$, there being a storage battery 8 having leads $9^a$—$9^b$ connected to the wires 10—11 forming the service mains; the armature $3^a$ of the generator is connected to these mains by means of wires $10^a$—$10^b$, a switch 12 being placed between the mains and the armature.

Pivotally mounted at 13 is a bell crank lever, the upper arm 14 of which is connected to the wire 15 from one side of the field winding $3^b$, this arm being adapted to contact with any one of a number of segments 16, resistance units 17 being placed between the segments and adapted to be included within the field circuit by movement of the arm 14. The apparatus just described constitutes a controller or rheostat for automatically regulating the voltage of the generator. One of the end segments 16 is connected to the wire $10^b$ from the armature $3^a$ through a wire 18, whereby the said field circuit is completed. Pivotally connected to the outer end of the other arm 19 of the bell crank lever is a link 20 engaging a core 21 movable within the solenoid 22, one of the terminals of the solenoid being connected with the wire $10^a$ from the generator armature through a conductor 23. The bell crank lever is maintained in the position shown in Fig. 2 in any desirable manner, preferably by means of a spring 24 fixed to the arm 14 and connected at its other end with a screw 25 movably mounted within a suitable support 26.

The switch 12 is made up of the arm 27 having blades 28—29 extending therefrom which are insulated from each other, the blades being connected respectively to the service mains 10—11; the said blades are adapted to engage in fixed contacts 30—31 connected to the leads $10^a$—$10^b$ respectively, which come from the generator armature. The arm 27 is pivotally mounted in position at 32, and adjacent its lower end carries an armature 33, electro-magnets 34—35 being positioned adjacent each other on opposite sides of the said armature, whereby the magnetic fields set up by the said electro-magnets may move the said arm 27 into position to open or close the connections between the mains 10—11 and the leads $10^a$—$10^b$. The upper end of this arm 27 is preferably provided with a mass of suitable material forming a counter-poise 36, whereby the arm will be brought to either final position after it has passed over the central vertical axis, passing through the pivotal support 32; this counter-poise may, if so desired, be replaced by a spring.

Adjacent opposite sides of the said arm 27, and adapted to contact with the conducting portion or blade 29 thereon, are contacts 37—38 connected respectively to one end of the electro-magnets 34—35; as shown in Fig. 2, this blade 29 on the arm engages the contact 38, whereby a certain circuit is formed, the arm in a second position adapted to come out of such engagement and into engagement with the contact 37, thereby forming another circuit.

A relay 39 having the movable armature 40 coöperates with the said electro-magnets 34—35 in substantially the following manner:—One terminal of the relay is connected to one terminal of the said solenoid 22 through a wire 41, the relay and solenoid being thereby connected in series. The other end of the relay is connected to one side of the generator armature 3ª, being tapped to the wire 18 leading from the conductor 10ᵇ; the movable armature 40 is normally in position as shown in Fig. 2, being maintained in such position by means of a spring 43 connected to the lower end thereof, and carrying an adjustable screw 44 mounted in a suitable support 45, whereby the force necessary to move this armature may be varied. Adjacent opposite sides of this movable armature are contacts 46—47, with either of which the armature is adapted to engage, being normally adjacent the contact 47, as shown. The other terminal of the electro-magnet 34 is connected to this fixed contact 47 by means of the wire 48, the other contact 46 being connected to the other terminal of the electro-magnet 35 through a wire 49; finally, the movable armature itself is connected to one of the service wires 10 by means of a wire 50, which is connected to the conductor 9ª leading from one side of the storage battery to this service wire.

In use the solenoid 22, which operates the controller or rheostat and which is in series with the relay 39, is connected across the armature of the generator, and the strength of the solenoid is such that when the voltage of the generator becomes excessive the core 21 will be moved, the bell crank thereby expanding the spring 24, bringing the end of the arm 14 adjacent some one of the segments 16, whereby some of the resistance units 17 are included in the field circuit, thereby reducing the generator voltage. The relay 39 is of such strength that when the generator voltage rises above a predetermined point the armature 40 will come adjacent the pole faces of this relay, the end of the armature engaging the fixed contact 46, whereby the following circuit is closed:— from one side of the battery 8 through the wire 50, through the armature 40 to the contact 46, through the wire 49 to the electro-magnet 35, through the fixed contact 38 to the service wire 11, and thence to the other side of the battery; the completion of this circuit sets up an electric field whereby the armature 33 at the end of the switch arm 27 comes adjacent the electro-magnet 35, whereby the blades 28—29 on this arm engage the contacts 30—31, thereby connecting the generator armature to the service wires 10—11; as long as the generator voltage remains above a predetermined point the armature 40 of the relay 39 will be maintained in the position shown, the circuit which includes this armature, however, being opened because of the blade 29 on the switch lever coming out of engagement with the contact 38; the arrangement of the parts is such that this blade 29 on the switch arm remains in engagement with either the contact 37 or 38 until the counter-poise 36 has passed to one side of the vertical line, passing through the pivotal support 32, whence the mass of the counter-poise finally brings the blades 28—29 into the engagement mentioned. If now the voltage of the generator should fall below a predetermined point, thereby causing a local current to flow through the battery and generator, the armature 40 of the relay 39 will come to the position shown in Fig. 2 and engaging the contact 47. In such position another circuit is closed as follows: from one side of the battery 8 through the wire 50, through the armature 40 to the contact 47, through the wire 48 to the electro-magnet 34, through the fixed contact 37, through the blade 29 of the arm 27, to the service wire 11, and thence to the other side of the battery; a flow of current through this circuit causes the electric fields set up by the electro-magnet 34 to return the switch arm 27 to the position shown in Fig. 2, the arm remaining in such position until the voltage of the generator rises sufficiently to again bring the armature 40 of the relay 39 into engagement with the contact 46; in such position of the switch arm 27 the contact 37 is out of engagement with the blade 29, whereby the circuit is broken.

The system illustrated and described is automatic in operation; it consists of few parts, and while being especially adapted to the windmill power plant illustrated, is also of general application.

The system is efficient in operation and economical in maintenance due to the simplicity of the different parts; it is clear, however, that the size and shape, as well as the strength of the material of which these parts are made, may be varied in order to adapt the inventive idea to different installations.

Having thus described my invention, I claim as new and desire to secure by Letters Patent:

1. In a system of electrical supply, the combination of a generator and a storage battery adapted to be operated in multiple, a rheostat in circuit with the field coils of the generator, a solenoid for operating said rheostat bridged across the armature of the generator, a switch disposed between the generator and the storage battery for cutting off the generator from the battery, a pair of magnets for controlling said switch, means disposed in series with said solenoid for controlling the circuits through said magnets, said last named means comprising a relay having an armature, a pair of contacts arranged to be engaged by the armature, one of said contacts having electrical connection with one of said magnets and the other contact having electrical connection with the other magnet, electrical connections between said armature and one terminal of said storage battery, and means carried by said switch for completing the electrical connection between the storage battery and either of said magnets.

2. In a system of electrical supply, the combination of a generator and a storage battery adapted to be operated in multiple, a rheostat in circuit with the field coils of the generator, a solenoid for operating said rheostat bridged across the armature of the generator, a switch disposed between the generator and the storage battery for cutting off the generator from the battery, a pair of magnets for controlling said switch, means disposed in series with said solenoid for controlling the circuits through said magnets, said last named means comprising a relay having an armature, a pair of contacts arranged to be engaged by the armature, one of said contacts having electrical connection with one of said magnets and the other contact having electrical connection with the other magnet, electrical connections between said armature and one terminal of said storage battery, means carried by said switch for completing the electrical connection between the storage battery and either of said magnets, said last named means comprising a conducting plate carried by said switch and having electrical connection with said storage battery, and a stationary contact arranged on each side of said switch and arranged to be engaged by said conducting plate during the movement of the switch, each of said last named stationary contacts being connected with one of said magnets.

3. In a system of electrical supply, the combination of a generator and a storage battery adapted to be operated in multiple, a rheostat in circuit with the field coils of the generator, electro-magnetic means for operating said rheostat, the actuation of said electro-magnetic means being responsive to the generator voltage, a relay in series with said rheostat operating means, a weighted switch disposed between said storage battery and said generator, and a pair of magnets for operating said switch, said magnets being controlled by the action of said relay.

4. In a system such as described, the combination of a generator and a storage battery adapted to be operated in multiple, a resistance in the field circuit of the generator, a magneto-electric device actuated by the armature of the generator for varying the portion of the said resistance included in the field circuit, a relay in series with the said magneto-electric device, a switch between the storage battery and the generator, and electro-magnetic devices for bringing the switch to different positions, the armature of the relay being included in the circuits actuating the said electro-magnetic devices controlling the switch, the said circuit being actuated by the storage battery.

5. In a system such as described, the combination of a generator and a storage battery operating in multiple, a switch for removing the generator from the system when the voltage thereof falls below that of the storage battery, a plurality of electro-magnets for moving the switch from open to closed position, and vice versa, a relay adapted to be excited by the said generator, the relay armature being connected to one side of the storage battery, one side of each of the electro-magnets being adapted to be connected to the other side of the storage battery, a plurality of contacts connected to the other sides of the electro-magnets, the armature of the said relay engaging one or the other of the said contacts, whereby when the voltage of the generator reaches a determined amount the armature will engage one of the contacts, thereby closing the switch, the armature engaging the other contact when the voltage of the generator falls below a determined amount, whereby the switch is opened.

In testimony whereof I have signed my name to this specification in the presence of two subscribing witnesses.

ALBERT H. HEYROTH.

Witnesses:
JOSEPH KIRSCHWING,
GENEVEVE M. ERICSON.